US009315408B2

(12) United States Patent
Aburada et al.

(10) Patent No.: US 9,315,408 B2
(45) Date of Patent: Apr. 19, 2016

(54) METHODS AND APPARATUSES FOR FABRICATING CONTINUOUS GLASS RIBBONS

(71) Applicants: Tomohiro Aburada, Kakegawa (JP); Anmol Agrawal, Corning, NY (US); Steven Roy Burdette, Big Flats, NY (US); Masumi Kihata, Kakegawa (JP); Gautam Nerendra Kudva, Horseheads, NY (US); Michael Yoshiya Nishimoto, Kakegawa (JP)

(72) Inventors: Tomohiro Aburada, Kakegawa (JP); Anmol Agrawal, Corning, NY (US); Steven Roy Burdette, Big Flats, NY (US); Masumi Kihata, Kakegawa (JP); Gautam Nerendra Kudva, Horseheads, NY (US); Michael Yoshiya Nishimoto, Kakegawa (JP)

(73) Assignee: Corning Incorporated, Corning, NY (US)

( * ) Notice: Subject to any disclaimer, the term of this patent is extended or adjusted under 35 U.S.C. 154(b) by 123 days.

(21) Appl. No.: 13/679,263

(22) Filed: Nov. 16, 2012

(65) Prior Publication Data
US 2014/0137601 A1 May 22, 2014

(51) Int. Cl.
*C03B 17/06* (2006.01)
(52) U.S. Cl.
CPC .................. *C03B 17/067* (2013.01)
(58) Field of Classification Search
None
See application file for complete search history.

(56) References Cited

U.S. PATENT DOCUMENTS

| 3,506,429 | A | 4/1970 | Overman |
| 4,906,270 | A | 3/1990 | Guenthner |
| 4,954,153 | A * | 9/1990 | Coleman et al. ............. 65/60.53 |
| 6,758,064 | B1 * | 7/2004 | Kariya ............................... 65/91 |
| 7,484,386 | B2 | 2/2009 | Janhunen |
| 2007/0062219 | A1 | 3/2007 | Blevins et al. |
| 2007/0130994 | A1 | 6/2007 | Boratav et al. |
| 2007/0140311 | A1 * | 6/2007 | House et al. ................... 374/100 |
| 2008/0282736 | A1 * | 11/2008 | Filippov et al. ................... 65/90 |
| 2009/0100873 | A1 | 4/2009 | Allan et al. |
| 2010/0218557 | A1 | 9/2010 | Aniolek et al. |
| 2011/0126587 | A1 | 6/2011 | Berkey et al. |
| 2011/0289967 | A1 * | 12/2011 | Burdette ...................... 65/29.19 |
| 2011/0302965 | A1 | 12/2011 | Aniolek et al. |

FOREIGN PATENT DOCUMENTS

| EP | 2377821 | 10/2011 | ............. C03B 18/22 |
| JP | 2005-350286 | 12/2005 | |
| WO | WO2011/047008 | 4/2011 | ................ C03B 9/00 |

OTHER PUBLICATIONS

Raytek, "Infrared LineScanner Series MP150 Thermal Imaging for Industrial Applications", 2011, pp. 1-6.*
International Search Report and Written Opinion dated Feb. 17, 2014, International Application No. PCT/US2013/069555, International Filing Date Nov. 12, 2013.

* cited by examiner

*Primary Examiner* — Lisa Herring
(74) *Attorney, Agent, or Firm* — John L. Haack

(57) ABSTRACT

Methods and apparatuses for fabricating continuous glass ribbons are disclosed. The method includes forming the continuous glass ribbon by drawing the continuous glass ribbon from a draw housing in a drawing direction, heating at least one portion of a central region of the continuous glass ribbon at a heating location downstream of the draw housing, sensing a temperature of the continuous glass ribbon at a sensed temperature location downstream of the draw housing, and automatically controlling the heating of the at least one portion of the central region of the continuous glass ribbon based on the sensed temperature to mitigate distortion of the continuous glass ribbon.

11 Claims, 4 Drawing Sheets

METHODS AND APPARATUSES FOR FABRICATING CONTINUOUS GLASS RIBBONS

BACKGROUND

1. Field

The present specification generally relates to methods and apparatuses for fabricating continuous glass ribbons and, more particularly, to methods and apparatuses for mitigating distortion during fabrication of continuous glass ribbons.

2. Technical Background

Continuous glass ribbons may be formed by processes such as the fusion draw process, the slot draw process, or other similar downdraw processes. The fusion draw process yields continuous glass ribbons which have surfaces with superior flatness and smoothness when compared to glass ribbons produced by other methods. Individual glass sheets sectioned from continuous glass ribbons formed by the fusion draw process can be used in a variety of devices including flat panel displays, touch sensors, photovoltaic devices, and other electronic applications.

Continuous glass ribbons formed by the fusion draw process may bow or curve in a lateral direction due to temperature gradients in the glass as it cools. In particular, when a continuous glass ribbon emerges from a fusion drawing machine, the glass ribbon may bow or curve due to the difference in temperature between the edges of the glass ribbon (which tend to be thicker and cool slower) and the central portion of the glass ribbon (which tends to be thinner and cool faster). Distortions in the glass ribbon below the fusion drawing machine tend to propagate to the bottom of the draw where individual sheets of glass are sectioned from the ribbon by supporting the glass ribbon with a nosing device as the glass ribbon is scored and separated. Specifically, when a glass sheet is scored and separated from the continuous glass ribbon using a traveling anvil machine, a nosing device may be used to support the continuous ribbon during scoring. Engaging the scoring device with a curved glass ribbon tends to introduce stress into the glass ribbon which may distort or break the glass ribbon during scoring. Furthermore, the contact between the scoring device and the curved glass ribbon may also introduce motion in the ribbon which is propagated upstream of the scoring device and causes undesirable stress and warp in the ribbon.

Accordingly, alternative methods and apparatuses for fabricating continuous glass ribbons that mitigate distortion of the continuous glass ribbon are disclosed.

SUMMARY

In embodiments, a method for fabricating a continuous glass ribbon includes forming the continuous glass ribbon by drawing the continuous glass ribbon from a draw housing in a drawing direction, heating at least one portion of a central region of the continuous glass ribbon at a heating location downstream of the draw housing, sensing a temperature of the continuous glass ribbon at a sensed temperature location downstream of the draw housing, and automatically controlling the heating of the at least one portion of the central region of the continuous glass ribbon based on the sensed temperature to mitigate distortion of the continuous glass ribbon.

In embodiments, a method for fabricating a continuous glass ribbon includes forming the continuous glass ribbon by drawing the continuous glass ribbon from a draw housing in a drawing direction, heating at least one portion of a central region of the continuous glass ribbon at a heating location downstream of the draw housing, sensing a temperature of the continuous glass ribbon at a sensed temperature location downstream of the draw housing, sensing a shape of the continuous glass ribbon at a sensed shape location downstream of the draw housing, and automatically controlling the heating of the at least one portion of the central region of the continuous glass ribbon based on the sensed temperature and the sensed shape to mitigate distortion of the continuous glass ribbon.

In embodiments, an apparatus for fabricating a continuous glass ribbon by drawing the continuous glass ribbon in a drawing direction includes a draw housing including a bottom opening through which the continuous glass ribbon is drawn. The apparatus further includes a heating apparatus positioned downstream of the bottom opening of the draw housing at a heating location proximate to at least one portion of a central region of the continuous glass ribbon. The apparatus further includes a temperature sensor positioned downstream of the bottom opening of the draw housing at a sensed temperature location. The apparatus further includes a controller communicatively coupled to the heating apparatus and the temperature sensor. The controller automatically controls the heating apparatus based on the sensed temperature provided by the temperature sensor.

Additional features and advantages of the embodiments described herein are set forth in the detailed description, the claims, and the appended drawings.

The foregoing general description and the following detailed description provide various embodiments and provide an overview or framework for understanding the nature and character of the claimed subject matter. The accompanying drawings provide a further understanding of the various embodiments, and are incorporated into and constitute a part of this specification. The drawings and the description explain the principles and operations of the claimed subject matter.

BRIEF DESCRIPTION OF THE DRAWINGS

In embodiments.

DETAILED DESCRIPTION

Figure 1:
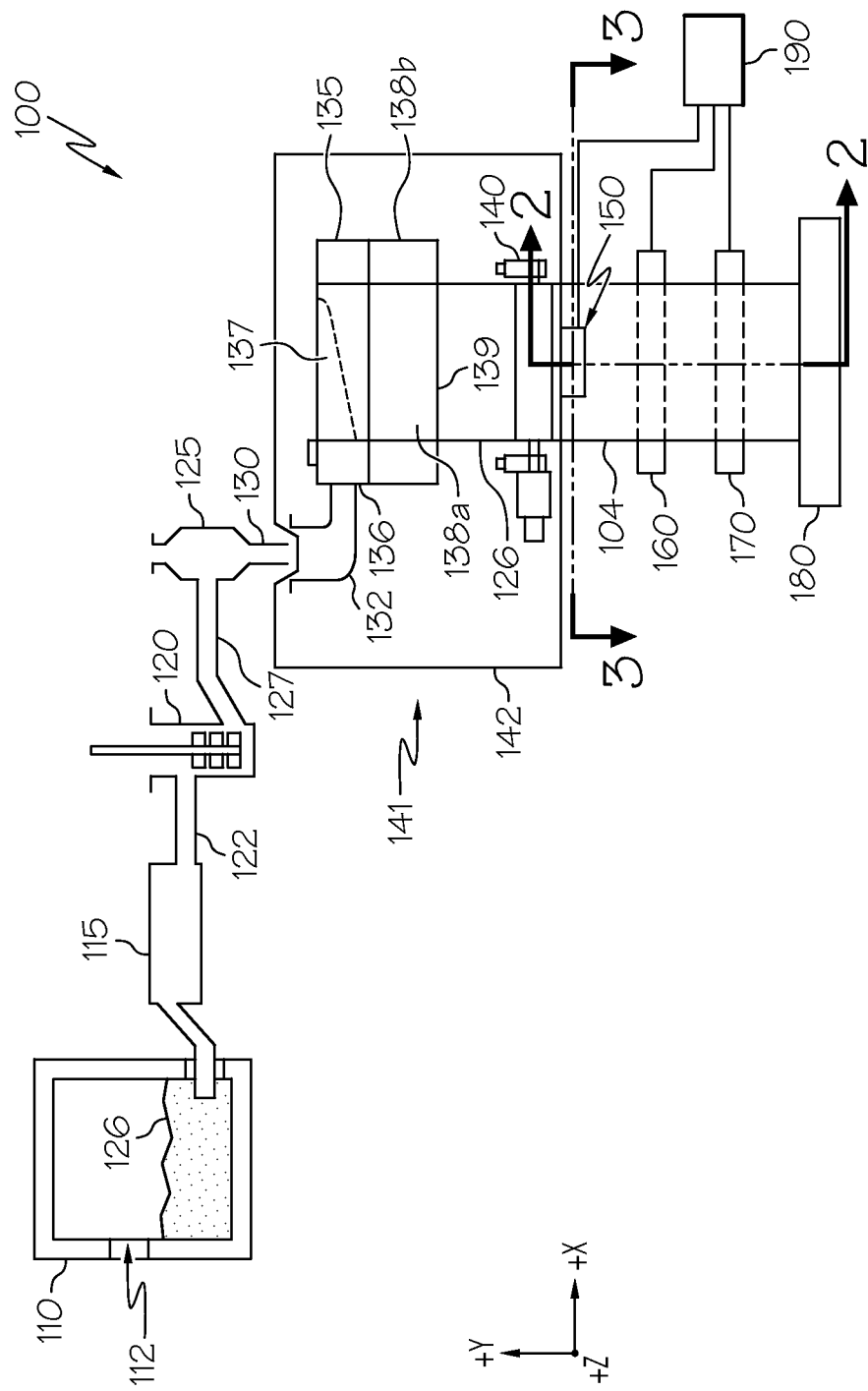
FIG. 1 schematically depicts an exemplary glass manufacturing apparatus including a heater positioned downstream of a draw housing that is operable to heat at least a portion of a central region of a continuous glass ribbon to mitigate distortion of the continuous glass ribbon.

Reference will now be made in detail to various embodiments of methods and apparatuses for fabricating continuous glass ribbons, examples of which are illustrated in the accompanying drawings. Whenever possible, the same reference numerals will be used throughout the drawings to refer to the same or like parts. FIG. 1 schematically depicts one embodiment of an apparatus for fabricating continuous glass ribbons by drawing the continuous glass ribbons in a drawing direction. The apparatus generally comprises a draw housing, a heating apparatus, a temperature sensor, and a controller. The draw housing comprises a bottom opening through which the continuous glass ribbon is drawn. The heating apparatus can be positioned downstream of the bottom opening of the draw housing at a heating location proximate to at least one portion of a central region of the continuous glass ribbon. The temperature sensor can be positioned downstream of the bottom opening of the draw housing at a sensed temperature location. The controller can be communicatively coupled to the heating apparatus and the temperature sensor. The controller automatically controls the heating apparatus based on the sensed temperature provided by the temperature sensor. A method for fabricating continuous glass ribbons can include, for example, forming the continuous glass ribbon by drawing the continuous glass ribbon from a draw housing in a drawing direction, heating at least one portion of a central region of the continuous glass ribbon at a heating location downstream of a draw housing, sensing a temperature of the continuous glass ribbon at a sensed temperature location downstream of the draw housing, and automatically controlling the heating of the at least one portion of the central region of the continuous glass ribbon based on the sensed temperature to mitigate distortion of the continuous glass ribbon. Methods and apparatuses for fabricating continuous glass ribbons are described in more detail herein with specific reference to the appended figures.

Coordinate axes are included in the drawings to provide a frame of reference for various components of the continuous glass ribbon fabrication apparatuses and methods described herein. As used herein, a "lateral" or "across-the-draw" direction is defined as the positive x or negative x direction of the coordinate axes shown in the drawings. A "downstream" or "drawing" direction is defined as the negative y direction of the coordinate axes shown in the drawings. An "upstream" direction is defined as the positive y direction of the coordinate axes shown in the drawings.

Figure 4:
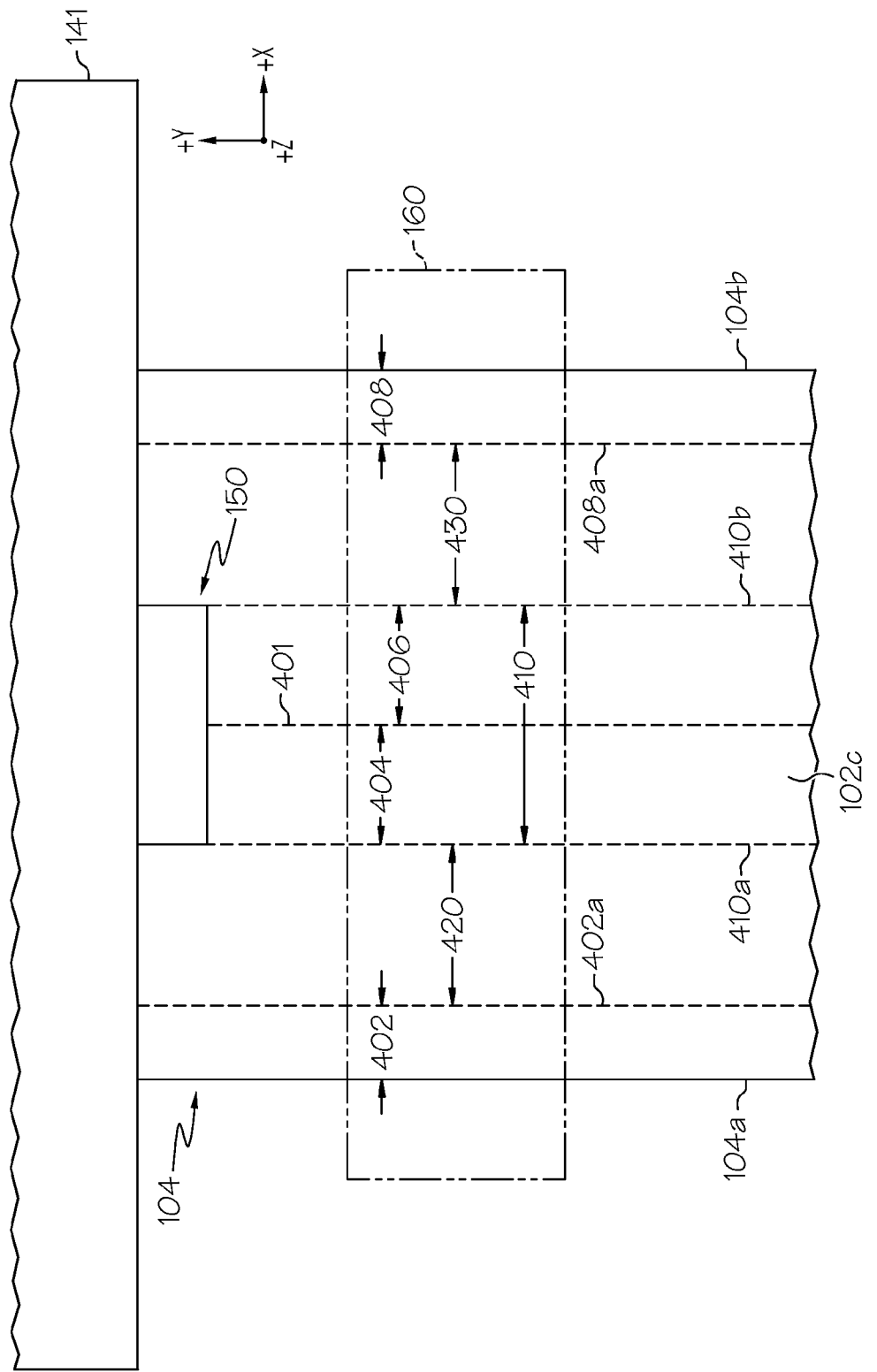
FIG. 4 schematically depicts a lateral view of the exemplary glass manufacturing apparatus of FIG. 1, illustrating various regions of a continuous glass ribbon and several possible temperature sensing locations.

FIG. 4 illustrates a portion of an exemplary continuous glass ribbon 104. The continuous glass ribbon 104 is defined in a lateral direction by a first edge 104a extending in the drawing direction and a second edge 104b extending in the drawing direction. The continuous glass ribbon 104 includes a centerline 401 extending in the drawing direction. The continuous glass ribbon 104 further includes a first bead portion 402, a central region 410, a second bead portion 408, a first near bead region 420, and a second near bead region 430.

Still referring to FIG. 4, the central region 410 of the continuous glass ribbon 104 extends in the drawing direction. The central region 410 is laterally defined by a first side 410a extending in the drawing direction and a second side 410b extending in the drawing direction. The first side 410a of the central region 410 is positioned between the first edge 104a and the centerline 401. The second side 410b of the central region 410 is positioned between the second edge 104b and the centerline 401. In the embodiment depicted in FIG. 4, the central region 410 includes a first lateral region 404 and a second lateral region 406. While the central region 410, the first side 410a, and the second side 410b are depicted at specific lateral locations in FIG. 4, it should be understood that in other embodiments, the lateral location of the central region 410, the first side 410a, and the second side 410b may differ from what is depicted in FIG. 4.

Still referring to FIG. 4, the first bead portion 402 extends in the drawing direction and is laterally defined by the first edge 104a of the continuous glass ribbon 104 and a first bead edge 402a laterally positioned between the first edge 104a and the centerline 401. The second bead portion 408 extends in the drawing direction and is laterally defined by the second edge 104b of the continuous glass ribbon 104 and a second bead edge 408a laterally positioned between the second edge 104b and the centerline 401. While the first bead portion 402, the first bead edge 402a, the second bead portion 408, and the second bead edge 408a are depicted at specific lateral locations in FIG. 4, it should be understood that in other embodiments, the first bead portion 402, the first bead edge 402a, the second bead portion 408, and the second bead edge 408a may differ from what is depicted in FIG. 4.

Still referring to FIG. 4, the first near bead region 420 is laterally positioned between the first bead portion 402 and the central region 410. The second near bead region 430 is laterally positioned between the second bead portion 408 and the central region 410.

Referring now to FIG. 1, one embodiment of an exemplary glass manufacturing apparatus 100 is schematically depicted. As an initial matter, while the exemplary glass manufacturing apparatus 100 described below forms continuous glass ribbons by a fusion draw process, it should be understood that the methods and apparatuses described herein may be used in conjunction with other down draw processes, including, without limitation, slot draw processes, and the like.

The glass manufacturing apparatus 100 depicted in FIG. 1 includes a melting vessel 110, a fining vessel 115, a mixing vessel 120, a delivery vessel 125, a fusion draw machine ("FDM") 141, a heating apparatus 150, a temperature sensor 160, a shape sensor 170, a traveling anvil machine ("TAM") 180, and a controller 190. The melting vessel 110 is fluidly coupled to the fining vessel 115. The fining vessel 115 is fluidly coupled to the mixing vessel 120 by a connecting tube 122. The mixing vessel 120 is, in turn, fluidly coupled to the delivery vessel 125 by a connecting tube 127. The delivery vessel 125 is fluidly coupled to the FDM 141 through a downcomer 130. The FDM 141 comprises a draw housing 142, an inlet 132, a forming vessel 135 fluidly coupled to the inlet 132, and a pull roll assembly 140. The forming vessel 135 includes an opening 136 that is fluidly coupled to the inlet 132 and a trough 137 fluidly coupled to the opening 136. The trough 137 comprises two sides 138a and 138b. The pull roll assembly 140 is positioned near the bottom of the draw housing 142 of the FDM 141.

The heating apparatus 150, the temperature sensor 160, and the shape sensor 170 are communicatively coupled to the controller 190. The heating apparatus 150 is positioned downstream of the bottom opening of the draw housing 142 at a heating location. In embodiments, the heating location may be about 5 inches to about 20 inches below the bottom opening of the draw housing 142. In embodiments, the heating location may be about 10 inches below the bottom opening of the draw housing 142. In embodiments, a temperature of the continuous glass ribbon 104 at the heating location may be in the range from about 200° C. to about 600° C. In embodiments, a maximum temperature (T) of the continuous glass ribbon at the heating location may be the temperature for which $\eta(T)/G=10000$ sec, where $\eta(T)$ is a viscosity of the continuous glass ribbon 104 at the heating location, and G is a shear modulus of the continuous glass ribbon 104 at the heating location.

In embodiments, the heating apparatus 150 may be attached to the bottom of the FDM 141, such as when the heating apparatus 150 is suspended from the bottom of the FDM 141. In other embodiments, the heating apparatus 150 may be separate from the FDM 141.

In embodiments, the heating apparatus 150 may include a first downstream heater positioned downstream of the bottom opening of the draw housing 142 at a first downstream heating location and a second downstream heater positioned downstream of the bottom opening of the draw housing 142 at a second downstream heating location (located downstream of the first downstream heating location). In embodiments, the first downstream heating location can be about 5 inches to about 20 inches below the bottom opening of the draw housing 142. Embodiments may include heaters at only one downstream heating location or heaters at more than two downstream heating locations.

In embodiments, the heating apparatus 150 can include an infrared heater. However, it should be understood that in other embodiments, the heating apparatus 150 can include a heater other than an infrared heater. In embodiments, in which the heating apparatus 150 includes an infrared heater, the infrared heater can be configured to emit radiation in a wavelength range of 1.5 microns to 6.5 microns, in a wavelength range of 2.0 microns to 6.5 microns, in a wavelength range of 2.0 microns to 4.0 microns, in a wavelength range of 2.0 microns to 3.0 microns, or in a wavelength range of 2.0 microns to 2.5 microns. In other embodiments, in which the heating apparatus 150 includes an infrared heater, the infrared heater can be configured to emit radiation in a wavelength range other than those explicitly disclosed.

Figure 2:
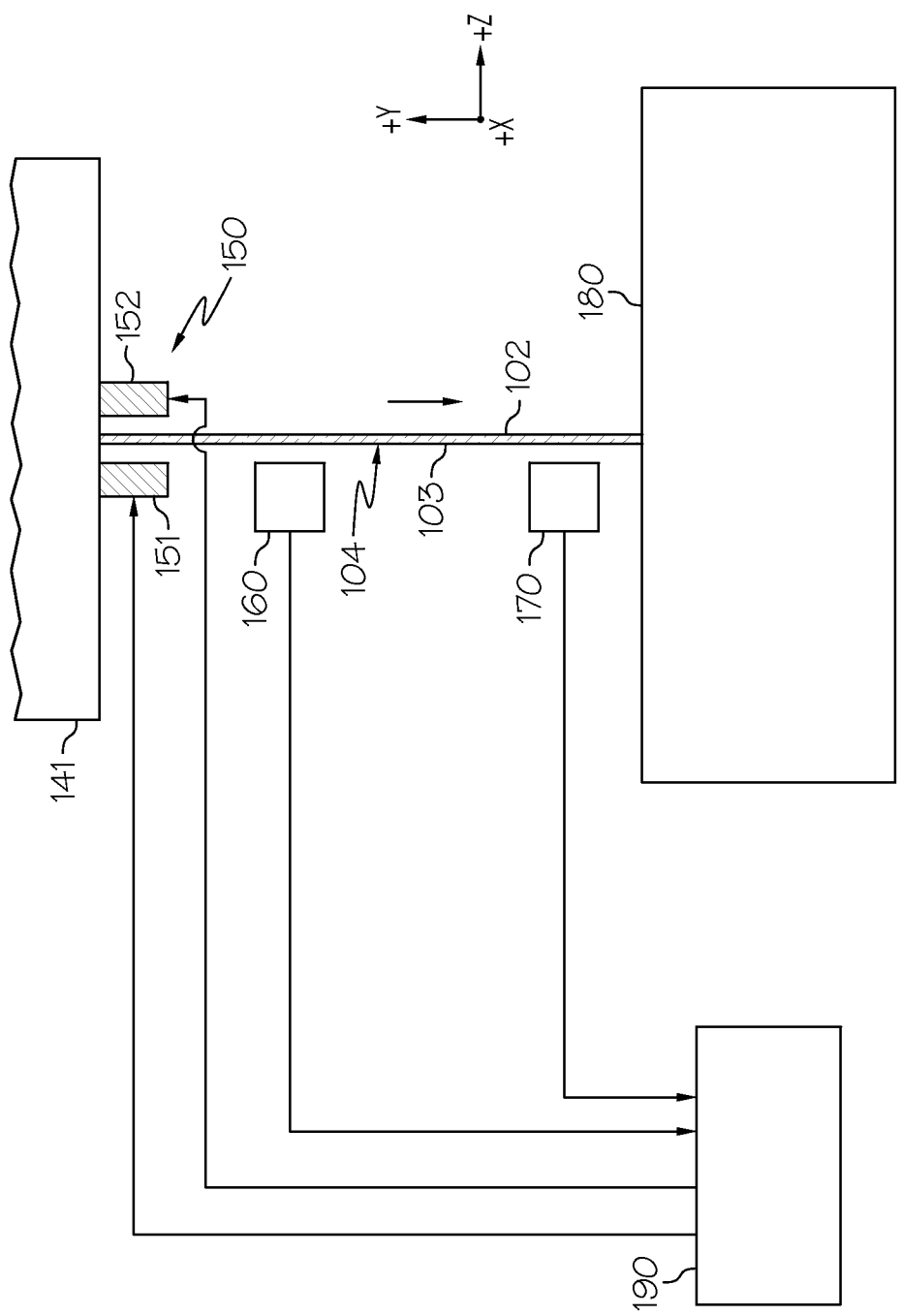
FIG. 2 schematically depicts a partial cross section of the exemplary glass manufacturing apparatus of FIG. 1, illustrating a heating apparatus configuration.

Referring now to FIG. 2, in embodiments, the heating apparatus 150 can include a first heater 151 and a second heater 152. The first heater 151 can be positioned proximate a first face 103 of the continuous glass ribbon 104. The second heater 152 can be positioned proximate a second face 102 (opposing the first face 103) of the continuous glass ribbon 104. The first heater 151 and the second heater 152 are communicatively coupled to the controller 190. In embodiments, the first heater 151 and the second heater 152 can be independently controlled by the controller 190. While the embodiment depicted in FIG. 2 includes a first heater 151 positioned proximate the first face 103 and a second heater 152 positioned proximate the second face 102, other embodiments may not include heaters positioned proximate both faces, such as in embodiments that include a heater positioned proximate only one face of the continuous glass ribbon 104.

Figure 3:
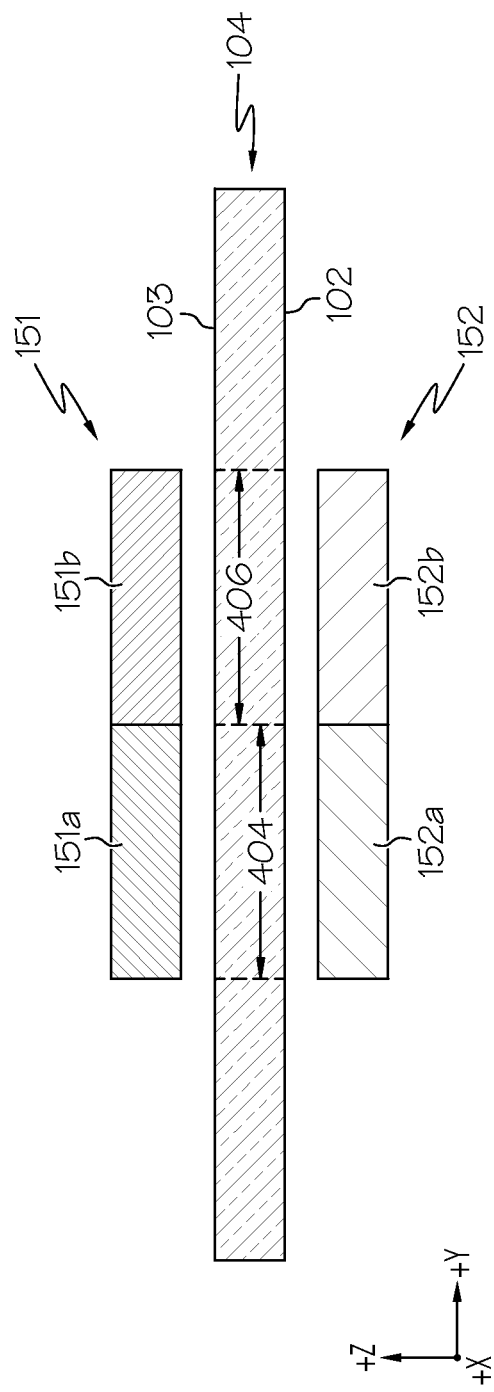
FIG. 3 schematically depicts a partial cross section of the exemplary glass manufacturing apparatus of FIG. 1, illustrating one possible configuration of heating elements.

Referring now to FIGS. 1-3, in embodiments, the first heater 151 includes a first heating element 151a positioned proximate the first lateral region 404 of the first face 103 and a second heating element 151b positioned proximate the second lateral region 406 of the first face 103. The first heating element 151a and the second heating element 151b are communicatively coupled to the controller 190. In embodiments, the first heating element 151a and the second heating element 151b may be independently controlled by the controller 190. The second heater 152 includes a first heating element 152a proximate the first lateral region 404 of the second face 102 and a second heating element 152b proximate the second lateral region 406 of the second face 102. The first heating element 152a and the second heating element 152b are communicatively coupled to the controller 190. In embodiments, the first heating element 152a and the second heating element 152b may be independently controlled by the controller 190. While both heaters 151 and 152 include two heating elements in the embodiment depicted in FIG. 3, in other embodiments, the first heater 151 can include more or less than two heating elements, and the second heater 152 can include more or less than two heating elements. In embodiments, at least one of the first heater 151 and the second heater 152 can include a first downstream heating element and a second downstream heating element positioned downstream of the first downstream heating element. In embodiments that include a first downstream heating element and a second downstream heating element, the first downstream heating element and the second downstream heating element can be independently controlled.

Referring again to FIG. 1, the temperature sensor 160 can be positioned downstream of the bottom opening of the draw housing 142 at a sensed temperature location. In embodiments, the temperature sensor 160 can be mounted to the glass manufacturing apparatus 100 at a location sufficiently far from the continuous glass ribbon 104 so that active cooling of the temperature sensor 160 is not necessary. The temperature sensor 160 can be, for example, an infrared thermal imager, an infrared point pyrometer, or an infrared thermal scanner. However, the temperature sensor 160 can be a temperature sensor other than the preceding examples. Embodiments can include more than one temperature sensor 160, such as embodiments that utilize at least one temperature sensor 160 positioned proximate each face of the continuous glass ribbon 104. Other embodiments can include more than one temperature sensor 160 spaced laterally apart to separately sense temperatures at separate lateral locations of the continuous glass ribbon.

Still referring to FIG. 1, the shape sensor 170 is positioned downstream of the bottom opening of the draw housing 142 at a sensed shape location downstream of the heating apparatus 150. The shape sensor 170 can be used to determine the curvature or shape of the continuous glass ribbon 104 at the sensed shape location. The shape sensor 170 may include, for example, an ultraviolet ribbon shape sensor (e.g., the shape measurement sensor as described in U.S. Pat. No. 7,920,257, entitled "Systems and methods for determining the shape of glass sheets" and issued on Apr. 5, 2011 to An, et al., the entirety of which is hereby incorporated by reference) or a quantifiable sheet position sensor (e.g., the CCS PRIMA chromatic confocal system (P9-CCSPRI) including one or more optical pens (P9-OPCORN), commercially available from Sciences et Techniques Industrielles de la Lumiére). In embodiments, the shape sensor 170 may include both an ultraviolet ribbon shape sensor and a quantifiable sheet position sensor. The shape sensor 170 may include a sensor other than an ultraviolet ribbon shape sensor or a quantifiable sheet position sensor, such as embodiments in which the shape sensor 170 includes a reflective ribbon shape sensor.

The TAM 180 generally comprises a nosing material and a scoring apparatus, which are used to score and separate discrete glass sheets from the continuous glass ribbon 104. The TAM 180 is positioned downstream of the heating apparatus 150, the temperature sensor 160, and the shape sensor 170. While the embodiment illustrated in FIG. 1 depicts the temperature sensor 160 downstream of the heating apparatus 150, and the shape sensor 170 downstream of both the heating apparatus 150 and the temperature sensor 160, in other embodiments, the relative downstream positioning of the heating apparatus 150, the temperature sensor 160, and the shape sensor 170 can be different from that depicted in FIG. 1. For example, in embodiments, the heating apparatus 150 can be positioned downstream of the temperature sensor 160. In embodiments, the temperature sensor 160 may be positioned downstream of the shape sensor 170. In embodiments, the heating apparatus 150 may be positioned downstream of both the temperature sensor 160 and the shape sensor 170. Furthermore, while the embodiment depicted in FIG. 1 includes a shape sensor 170, other embodiments of the glass manufacturing apparatus 100 may not include the shape sensor 170.

Still referring to FIG. 1, during operation of the glass manufacturing apparatus 100 depicted in FIG. 1, glass batch materials are introduced into the melting vessel 110 as indicated by arrow 112. The batch materials are melted in the melting vessel 110 to form molten glass 126. The molten glass 126 flows from the melting vessel 110 to the fining vessel 115. The fining vessel 115 receives the molten glass 126 in a high temperature processing area in which bubbles are removed from the molten glass 126. After being processed in the fining vessel 115, the molten glass 126 flows from to the mixing vessel 120 via connecting tube 122 in which the molten glass 126 is mixed. After being mixed in the mixing vessel 120, the molten glass 126 flows into the delivery vessel 125 via connecting tube 127.

The delivery vessel 125 supplies the molten glass 126 through a downcomer 130 into the inlet 132 of the FDM 141, through which the molten glass 126 is supplied to the forming vessel 135. The molten glass 126 is received through the opening 136 of the forming vessel 135 and flows into the trough 137. After entering the trough 137, the molten glass 126 overflows and runs down two sides 138a and 138b of the trough 137 before fusing together at a root 139. The root 139 is where the two sides 138a and 138b come together and where the two overflow walls of molten glass 126 rejoin (e.g., refuse) before being drawn downward by the pull roll assembly 140 to form the continuous glass ribbon 104.

After being formed and drawn downward by the pull roll assembly 140, the continuous glass ribbon 104 exits the bottom opening of the draw housing 142. After exiting the draw housing 142, the continuous glass ribbon 104 begins to cool, as described above, and distortion in the continuous glass ribbon 104 may occur due to thickness and cooling rate variations across the ribbon. To mitigate these distortions, at least one portion of a central region of the continuous glass ribbon 104 is heated by the heating apparatus 150 at a heating location downstream of the draw housing 142. The temperature of the continuous glass ribbon 104 is sensed at a sensed temperature location downstream of the bottom opening of the draw housing 142 by the temperature sensor 160. In embodiments, a shape of the continuous glass ribbon 104 is sensed at a sensed shape location downstream of the bottom opening of the draw housing 142. However, embodiments do not include the shape sensor 170. The heating of the at least one portion of the central region of the continuous glass ribbon 104 is automatically controlled based on the sensed temperature (and optionally also based on the sensed shape in embodiments that include a shape sensor 170). Once the continuous glass ribbon passes the heating apparatus 150, the temperature sensor 160, and the shape sensor 170, individual sheets of glass are scored and separated from the continuous glass ribbon 104 by the TAM 180.

The control of the heating of the continuous glass ribbon 104 will now be described in further detail with reference to FIGS. 1 to 4. At least one portion of the central region of the continuous glass ribbon 104 is heated by heating only one face of the continuous glass ribbon 104, such as when the continuous glass ribbon 104 is heated by one or more heaters positioned proximate to only one face of the continuous glass ribbon 104. In embodiments, such as the embodiment depicted in FIG. 2, the at least one portion of the central region of the continuous glass ribbon 104 is heated by heating at least one of the first face 103 and the second face 102 of the continuous glass ribbon 104. In embodiments, such as the embodiment depicted in FIG. 3, the at least one portion of the central region of the continuous glass ribbon 104 is heated by heating at least one of the first lateral region 404 and the second lateral region 406 of the continuous glass ribbon 104.

Referring now to FIGS. 1 and 4, the heating of the at least one portion of the central region of the continuous glass ribbon 104 by the heating apparatus 150 is automatically controlled by the controller 190 based on the sensed temperature provided to the controller 190 by the temperature sensor 160. Two alternative schemes for controlling the heating of at least one portion of the continuous glass ribbon 104 based on various sensed temperature information is detailed below. However, there are numerous ways other than those described below to control the heating of the glass ribbon based on sensed temperature information to mitigate distortion in the glass ribbon.

I. Heating Control Based on a Temperature Difference Between a Near Bead Temperature and a Central Temperature Still referring to FIGS. 1 and 4, in embodiments, the temperature sensor 160 may sense a first near bead temperature representative of the temperature of the first near bead region 420 and a central temperature representative of the temperature of the central region 410. In embodiments, the first near bead temperature and the central bead temperature are sensed at substantially the same downstream location. In embodiments in which the temperature sensor 160 comprises a plurality of infrared point pyrometers, the first near bead temperature may be sensed at a location within the first near bead region 420 by a first infrared point pyrometer and the central temperature may be sensed at a location within the central region 410 by a second infrared point pyrometer. In embodiments in which the temperature sensor 160 includes an infrared thermal scanner, the first near bead temperature may be determined based on a point or scan line within the first near bead region 420 and the central temperature may be determined based on a point or scan line within the central region 410.

In embodiments in which the temperature sensor 160 comprises an infrared thermal imager, an infrared image of the continuous glass ribbon 104 may be captured, the first near bead temperature may be automatically determined from the infrared image, and the central temperature may be automatically determined from the infrared image. In embodiments, the first near bead temperature may be automatically determined from a first two-dimensional region (e.g., a box, ellipse, etc.) within the first near bead region 420. The first near bead temperature may be: (i) the minimum temperature of the first two-dimensional region; (ii) the maximum temperature of the first two-dimensional region; or (iii) the average temperature of the first two-dimensional region. In embodiments, the first near bead temperature may be calculated such that it does not represent the minimum, maximum, or average temperature of the first two-dimensional region. In embodiments, the central temperature may be automatically determined from a second two-dimensional region (e.g., a box, ellipse, etc.) within the central region 410. The central temperature may be: (i) the minimum temperature of the second two-dimensional region; (ii) the maximum temperature of the second two-dimensional region; or (iii) the average temperature of the second two-dimensional region. In embodiments, the central temperature may be calculated such that it does not represent the minimum, maximum, or average temperature of the second two-dimensional region.

Once the first near bead temperature and central temperature are determined, the heating of the at least one portion of the central region is controlled based on a difference between the first near bead temperature and the central temperature. To control the heating of the at least one portion of the central region, the controller 190 may employ a proportional integral derivative ("PID") control algorithm, a simple on/off control algorithm or any other control algorithm operable to alter the current supplied to the heating apparatus 150 to reduce the temperature gradient of the continuous glass ribbon 104 at the heating location. For example, in embodiments, upon detecting a difference between the first near bead temperature and the central temperature, an amount of current provided to the heating apparatus 150 may be increased to reduce the difference between the first near bead temperature and the central temperature to a desired temperature difference.

While this particular control approach has been described in the context of sensing a first near bead temperature representative of the temperature of the first near bead region 420 and controlling the heating of the glass ribbon based on the difference between the first near bead temperature and the sensed central temperature, the near bead temperature of the second near bead region 430 may be sensed and used to control the heating of the glass ribbon based on the difference between the second near bead temperature and the sensed central temperature using a similar approach.

II. Heating Control Based on Temperature Differences Between a Bead Temperature, a First Lateral Region Temperature, and a Second Lateral Region Temperature Referring now to FIGS. 1, 3, and 4, in embodiments, the temperature sensor 160 may sense a first near bead temperature representative of the temperature of the first near bead region 420, a first lateral region temperature representative of the temperature of the first lateral region 404 of the central region 410, and a second lateral region temperature representative of the temperature of the second lateral region 406 of the central region 410. In embodiments, the first near bead temperature, the first lateral region temperature, and the second lateral region temperature are sensed at substantially the same downstream location. In embodiments in which the temperature sensor 160 comprises a plurality of infrared point pyrometers, the first near bead temperature may be sensed at a location within the first near bead region 420 by a first infrared point pyrometer, the first lateral region temperature may be sensed at a location within the first lateral region 404 by a second infrared point pyrometer, and the second lateral region temperature may be sensed at a location within the second lateral region 406 by a third infrared point pyrometer. In embodiments in which the temperature sensor 160 includes an infrared thermal scanner, the first near bead temperature may be determined based on a point or scan line within the first near bead region 420, the first lateral region temperature may be determined based on a point or scan line within the first lateral region 404, and the second lateral region temperature may be determined based on a point or scan line within the second lateral region 406.

In embodiments in which the temperature sensor 160 comprises an infrared thermal imager, an infrared image of the continuous glass ribbon 104 may be captured, the first near bead temperature may be automatically determined from the infrared image, the first lateral region temperature may be automatically determined from the infrared image, and the second lateral region temperature may be automatically determined from the infrared image. In embodiments, the first near bead temperature may be automatically determined from a first two-dimensional region (e.g., a box, ellipse, etc.) within the first near bead region 420. The first near bead temperature may be: (i) the minimum temperature of the first two-dimensional region; (ii) the maximum temperature of the first two-dimensional region; or (iii) the average temperature of the first two-dimensional region. In embodiments, the first near bead temperature may be calculated such that it does not represent the minimum, maximum, or average temperature of the first two-dimensional region. In embodiments, the first lateral region temperature may be automatically determined from a second two-dimensional region (e.g., a box, ellipse, etc.) within the first lateral region 404. The first lateral region temperature may be: (i) the minimum temperature of the second two-dimensional region; (ii) the maximum temperature of the second two-dimensional region; or (iii) the average temperature of the second two-dimensional region. In embodiments, the first lateral region temperature may be calculated such that it does not represent the minimum, maximum, or average temperature of the second two-dimensional region. In embodiments, the second lateral region temperature may be automatically determined from a third two-dimensional region (e.g., a box, ellipse, etc.) within the second lateral region 406. The second lateral region temperature may be: (i) the minimum temperature of the third two-dimensional region; (ii) the maximum temperature of the third two-dimensional region; or (iii) the average temperature of the third two-dimensional region. In embodiments, the second lateral region temperature may be calculated such that it does not represent the minimum, maximum, or average temperature of the third two-dimensional region.

Once the first near bead temperature, the first lateral region temperature, and the second lateral region temperature are determined, the first lateral region 404 is heated based on a first temperature difference between the first near bead temperature and the first lateral region temperature. Similarly, the second lateral region 406 is heated based on a second temperature difference between the first near bead temperature and the second lateral region temperature. To control the heating of the first lateral region and the second lateral region, the controller 190 may employ a proportional integral derivative ("PID") control algorithm, a simple on/off control algorithm or any other control algorithm operable to alter the current supplied to the heating apparatus 150 to reduce the temperature gradient of the continuous glass ribbon 104 at the heating location. For example, in one embodiment, an amount of current provided to the first heating element 151a of the first heater 151 may be increased to reduce the first difference between the first near bead temperature and the first lateral region temperature to a desired temperature difference. Similarly, an amount of current provided to the second heating element 151b of the first heater 151 may be increased to reduce the first difference between the first near bead temperature and the first lateral region temperature to a desired temperature difference.

In embodiments, the heating of the at least one central region of the continuous glass ribbon 104 may be controlled based on the sensed temperature by varying a distance of the heating apparatus 150 from the continuous glass ribbon 104, such as by moving the heating apparatus 150 closer to the continuous glass ribbon 104 when a greater degree of heating is desired and moving the heating apparatus 150 farther from the continuous glass ribbon 104 when a lesser degree of heating is desired.

In embodiments, in addition to controlling the heating of the at least one central region of the continuous glass ribbon 104 based on sensed temperature, the heating of the at least one central region of the continuous glass ribbon may also be controlled based on a sensed shape. In such embodiments, a shape or bow of the continuous glass ribbon is sensed by the shape sensor 170 and communicated to the controller 190. The controller 190 adjusts the heating if a distortion of the continuous glass ribbon is sensed by the shape sensor 170 to mitigate the sensed distortion. For example, when the sensed shape exceeds a shape set point, the controller 190 may increase the heating of the at least one central region of the continuous glass ribbon 104 and when the sensed shape is less than the shape set point, the controller 190 may decrease the heating of the at least one central region of the continuous glass ribbon.

The disclosed methods and apparatuses for fabricating continuous glass ribbons are particularly well suited for use in conjunction with continuous glass ribbons which have widths of about 50 inches to about 150 inches and thicknesses of about 0.1 mm to about 3.5 mm. However, the disclosed techniques can also be suitable for use in conjunction with continuous glass ribbons having other widths and thicknesses.

The methods and apparatuses described herein may be used to mitigate distortion during fabrication of continuous glass ribbons, such as the continuous glass ribbons produced with the fusion draw process or similar down draw processes. Heating at least a portion of the central region of a continuous glass ribbon downstream of the draw housing can reduce the temperature difference between the edges of the glass ribbon and the central region of the glass ribbon as the glass ribbon traverses downstream from the draw housing, to mitigate the bowing of the glass ribbon that can result from an uncontrolled temperature gradient between the edges and central region. By controlling the heating of the glass ribbon at a heating location downstream of the draw housing, the glass ribbon will be flatter at the bottom of the draw and may facilitate easier scoring of the glass ribbon and separation of individual glass sheets from the glass ribbon. Furthermore, stresses, deformation and potential breakage of the continuous glass ribbon during scoring and separation can be substantially mitigated or eliminated by controlling the heating of the glass ribbon to provide a flatter glass ribbon at the bottom of the draw, as described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

In a first aspect, the disclosure provides a method for fabricating a continuous glass ribbon, the method comprising: forming the continuous glass ribbon by drawing the continuous glass ribbon from a draw housing in a drawing direction; heating at least one portion of a central region of the continuous glass ribbon at a heating location downstream of the draw housing; sensing a temperature of the continuous glass ribbon at a sensed temperature location downstream of the draw housing; and controlling, automatically, the heating of the at least one portion of the central region of the continuous glass ribbon based on the sensed temperature to mitigate distortion of the continuous glass ribbon.

In a second aspect, the disclosure provides a method for fabricating a continuous glass ribbon, the method comprising: forming the continuous glass ribbon by drawing the continuous glass ribbon from a draw housing in a drawing direction; heating at least one portion of a central region of the continuous glass ribbon at a heating location downstream of the draw housing; sensing a temperature of the continuous glass ribbon at a sensed temperature location downstream of the draw housing; sensing a shape of the continuous glass ribbon at a sensed shape location downstream of the draw housing; and controlling, automatically, the heating of the at least one portion of the central region of the continuous glass ribbon based on the sensed temperature and the sensed shape to mitigate distortion of the continuous glass ribbon.

In a third aspect, the disclosure provides the method of the first aspect, further comprising: sensing a shape of the continuous glass ribbon at a sensed shape location downstream of the draw housing; and controlling the heating of the at least one portion of the central region of the continuous glass ribbon based on the sensed shape, wherein the heating of the at least one portion of the central region is adjusted if a distortion of the shape of the continuous glass ribbon is sensed.

In a fourth aspect, the disclosure provides the method of any one of the first through third aspects, wherein the continuous glass ribbon further comprises a first face and a second face opposing the first face, wherein the at least one portion of the central region of the continuous glass ribbon is heated by heating at least one of the first face and the second face at the central region.

In a fifth aspect, the disclosure provides the method of any one of the first through fourth aspects, wherein the central region of the continuous glass ribbon further comprises a first lateral region and a second lateral region, wherein the at least one portion of the central region of the continuous glass ribbon is heated by heating at least one of the first lateral region and the second lateral region.

In a sixth aspect, the disclosure provides the method of any one of the first through fifth aspects, wherein the at least one portion of the central region of the continuous glass ribbon is heated with an infrared heater.

In a seventh aspect, the disclosure provides the method of the sixth aspect, wherein the infrared heater emits radiation in a wavelength range of 1.5 microns to 6.5 microns.

In an eighth aspect, the disclosure provides the method of any one of the first through seventh aspects, wherein the continuous glass ribbon further comprises a first near bead region, wherein: the temperature of the continuous glass ribbon is sensed by sensing a first near bead temperature within the first near bead region and sensing a central temperature within the central region; and the heating of the at least one portion of the central region is controlled based on a difference between the sensed first near bead temperature and the sensed central temperature.

In a ninth aspect, the disclosure provides the method of the eighth aspect, wherein the first near bead temperature and the central temperature are sensed at a same downstream location.

In a tenth aspect, the disclosure provides the method of any one of the eighth through ninth aspects, wherein the temperature of the continuous glass ribbon is sensed with an infrared thermal imager, and the method further comprises: capturing an infrared image of the continuous glass ribbon at the downstream sensed temperature location; determining, automatically, the first near bead temperature from the infrared image; and determining, automatically, the central temperature from the infrared image.

In an eleventh aspect, the disclosure provides the method of the tenth aspect, wherein the captured infrared image includes a first two-dimensional region located within the first near bead region and a second two-dimensional region located within the central region, wherein: (i) the first near bead temperature is the minimum temperature of the first two-dimensional region and the central temperature is the minimum temperature of the second two-dimensional region; (ii) the first near bead temperature is the maximum temperature of the first two-dimensional region and the central temperature is the maximum temperature of the second two-dimensional region; or (iii) the first near bead temperature is the average temperature of the first two-dimensional region and the central temperature is the average temperature of the second two-dimensional region.

In a twelfth aspect, the disclosure provides the method of any one of the first through eleventh aspects, wherein: the continuous glass ribbon further comprises a first near bead region; the central region of the continuous glass ribbon further comprises a first lateral region and a second lateral region; the temperature of the continuous glass ribbon is sensed by sensing a first near bead temperature within the first near bead region and sensing a first lateral region temperature within the first lateral region; and the heating of the at least one portion of the central region is controlled by heating at least one of the first lateral region and the second lateral region based on a first difference between the sensed first near bead temperature and the sensed first lateral region temperature.

In a thirteenth aspect, the disclosure provides the method of any one of the first through twelfth aspects, wherein the downdraw process is a fusion downdraw process.

In a fourteenth aspect, the disclosure provides an apparatus for fabricating a continuous glass ribbon by drawing the continuous glass ribbon in a drawing direction, the apparatus comprising: a draw housing comprising a bottom opening through which the continuous glass ribbon is drawn; a heating apparatus positioned downstream of the bottom opening of the draw housing at a heating location proximate to at least one portion of a central region of the continuous glass ribbon; a temperature sensor positioned downstream of the bottom opening of the draw housing at a sensed temperature location; and a controller communicatively coupled to the heating apparatus and the temperature sensor, wherein the controller automatically controls the heating apparatus based on the sensed temperature provided by the temperature sensor.

In a fifteenth aspect, the disclosure provides the apparatus of the fourteenth aspect, wherein the apparatus further comprises a shape sensor positioned downstream of the bottom opening of the draw housing at a sensed shape location, wherein the controller is communicatively coupled to the shape sensor and the controller automatically controls the heating apparatus based on a sensed shape provided by the shape sensor.

In a sixteenth aspect, the disclosure provides the apparatus of the fifteenth aspect, wherein the shape sensor is an ultraviolet ribbon shape sensor, a reflective ribbon shape sensor, or a quantifiable sheet position sensor.

In a seventeenth aspect, the disclosure provides the apparatus of any one of the fourteenth through sixteenth aspects, wherein the temperature sensor is an infrared thermal imager, an infrared point pyrometer, or an infrared thermal scanner.

In an eighteenth aspect, the disclosure provides the apparatus of any one of the fourteenth through seventeenth aspects, wherein the continuous glass ribbon further comprises a first face and a second face opposing the first face, wherein the heating apparatus comprises a first heater positioned proximate the first face and a second heater positioned proximate the second face.

In a nineteenth aspect, the disclosure provides the apparatus of any one of the fourteenth through eighteenth aspects, wherein the central region of the continuous glass ribbon further comprises a first lateral region and a second lateral region, wherein the heating apparatus comprises a first heating element positioned proximate the first lateral region and a second heating element positioned proximate the second lateral region.

In a twentieth aspect, the disclosure provides the method of any one of the first through thirteenth aspects, wherein the heating location is about 5 inches to about 20 inches below the bottom opening of the draw housing.

In a twenty-first aspect, the disclosure provides the method of any one of the first through thirteenth aspects and the twentieth aspect, wherein a temperature of the continuous glass ribbon at the heating location is in the range from about 200° C. to about 600° C.

In a twenty-second aspect, the disclosure provides the method of any one of the first through thirteenth aspects and the twentieth through twenty-first aspects, wherein a maximum temperature (T) of the continuous glass ribbon at the heating location is the temperature for which $\eta(T)/G=10000$ sec, where $\eta(T)$ is a viscosity of the continuous glass ribbon at the heating location, and G is a shear modulus of the continuous glass ribbon at the heating location.

In a twenty-third aspect, the disclosure provides the apparatus of any one of the fourteenth through nineteenth aspects, wherein the heating location is about 5 inches to about 20 inches below the bottom opening of the draw housing.

In a twenty-fourth aspect, the disclosure provides the apparatus of any one of the fourteenth through nineteenth aspects and the twenty-third aspect, wherein a temperature of the continuous glass ribbon at the heating location is in the range from about 200° C. to about 600° C.

In a twenty-fifth aspect, the disclosure provides the apparatus of any one of the fourteenth through nineteenth aspects and the twenty-third through twenty-fourth aspects, wherein a maximum temperature (T) of the continuous glass ribbon at the heating location is the temperature for which $\eta(T)/G=10000$ sec, where $\eta(T)$ is a viscosity of the continuous glass ribbon at the heating location, and G is a shear modulus of the continuous glass ribbon at the heating location.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

What is claimed is:

1. A method for fabricating a continuous glass ribbon, the method comprising:
    forming the continuous glass ribbon by drawing the continuous glass ribbon from a draw housing in a drawing direction, wherein the continuous glass ribbon comprises a central region, a first bead portion, and a first near bead region laterally positioned between the first bead portion and the central region, wherein the central region comprises a first lateral region and a second lateral region;
    heating the first lateral region of the central region and the second lateral region of the central region at a heating location downstream of the draw housing;
    sensing a first near bead temperature within the first near bead region, sensing a first lateral region temperature within the first lateral region of the central region, and sensing a second lateral region temperature within the second lateral region of the central region at a sensed temperature location downstream of the draw housing;
    controlling, automatically, the heating of the first lateral region of the central region of the continuous glass ribbon based on a first temperature difference between the first near bead temperature and the first lateral region temperature to mitigate distortion of the continuous glass ribbon; and
    controlling, automatically, the heating of the second lateral region of the central region of the continuous glass ribbon based on a second temperature difference between the first near bead temperature and the second lateral region temperature to mitigate distortion of the continuous glass ribbon.

2. The method of claim 1, further comprising:
    sensing a shape of the continuous glass ribbon at a sensed shape location downstream of the draw housing; and controlling the heating of at least one of the first lateral region of the central region and the second lateral region of the central region based on the sensed shape, wherein the heating of at least one of the first lateral region of the central region and the second lateral region of the central region is adjusted if a distortion of the shape of the continuous glass ribbon is sensed.

3. The method of claim 1, wherein the continuous glass ribbon further comprises a first face and a second face opposing the first face, wherein at least one of the first lateral region of the central region and the second lateral region of the central region is heated by heating at least one of the first face and the second face at the first lateral region of the central region or the second lateral region of the central region.

4. The method of claim 1, wherein at least one of the first lateral region of the central region and the second lateral region of the central region is heated with an infrared heater.

5. The method of claim 4, wherein the infrared heater emits radiation in a wavelength range of 1.5 microns to 6.5 microns.

6. The method of claim 1, wherein the first near bead temperature, the first lateral region temperature, and the second lateral region temperature are sensed at a same downstream location.

7. The method of claim 1, wherein the first near bead temperature, the first lateral region temperature, and the second lateral region temperature are sensed with an infrared thermal imager, and the method further comprises:
    capturing an infrared image of the continuous glass ribbon at the sensed temperature location;
    determining, automatically, the first near bead temperature from the infrared image;
    determining, automatically, the first lateral region temperature from the infrared image; and
    determining, automatically, the second lateral region temperature from the infrared image.

8. The method of claim 7, wherein the captured infrared image includes a first two-dimensional region located within the first near bead region, a second two-dimensional region located within the first lateral region, and a third two-dimensional region located within the second lateral region, wherein:
    (i) the first near bead temperature is the minimum temperature of the first two-dimensional region, the first lateral region temperature is the minimum temperature of the second two-dimensional region, and the second lateral region temperature is the minimum temperature of the third two-dimensional region;
    (ii) the first near bead temperature is the maximum temperature of the first two-dimensional region, the first lateral region temperature is the maximum temperature of the second two-dimensional region, and the second lateral region temperature is the maximum temperature of the third two-dimensional region; or
    (iii) the first near bead temperature is the average temperature of the first two-dimensional region, the first lateral region temperature is the average temperature of the second two-dimensional region, and the second lateral region temperature is the average temperature of the third two-dimensional region.

9. The method of claim 1, wherein (i) the heating location is about 5 inches to about 20 inches below the bottom opening of the draw housing; (ii) a temperature of the continuous glass ribbon at the heating location is from about 200° C. to about 600° C.; or (iii) a maximum temperature (T) of the continuous glass ribbon at the heating location is the temperature for which $\eta(T)/G=10000$ sec, wherein $\eta(T)$ is a viscosity of the continuous glass ribbon at the heating location and G is a shear modulus of the continuous glass ribbon at the heating location.

10. A method for fabricating a continuous glass ribbon, the method comprising:
    forming the continuous glass ribbon by drawing the continuous glass ribbon from a draw housing in a drawing direction, wherein the continuous glass ribbon comprises a central region, a first bead portion, and a first near bead region laterally positioned between the first bead portion and the central region, wherein the central region comprises a first lateral region and a second lateral region;
    heating the first lateral region of the central region and the second lateral region of the central region at a heating location downstream of the draw housing;
    sensing a first near bead temperature within the first near bead region, sensing a first lateral region temperature within the first lateral region of the central region and sensing a second lateral region temperature within the second lateral region of the central region at a sensed temperature location downstream of the draw housing;
    sensing a shape of the continuous glass ribbon at a sensed shape location downstream of the draw housing;
    controlling, automatically, the heating of the first lateral region of the central region of the continuous glass ribbon based on a first temperature difference between the first near bead temperature and the first lateral region temperature and the sensed shape to mitigate distortion of the continuous glass ribbon; and
    controlling, automatically, the heating of the second lateral region of the central region of the continuous glass ribbon based on a second temperature difference between the first near bead temperature and the second lateral region temperature and the sensed shape to mitigate distortion of the continuous glass ribbon.

11. The method of claim 10, wherein (i) the heating location is about 5 inches to about 20 inches below the bottom opening of the draw housing; (ii) a temperature of the continuous glass ribbon at the heating location is from about 200° C. to about 600° C.; or (iii) a maximum temperature (T) of the continuous glass ribbon at the heating location is the temperature for which $\eta(T)/G=10000$ sec, wherein $\eta(T)$ is a viscosity of the continuous glass ribbon at the heating location and G is a shear modulus of the continuous glass ribbon at the heating location.

* * * * *